United States Patent
Springstroh

(10) Patent No.: US 11,140,118 B2
(45) Date of Patent: Oct. 5, 2021

(54) SYSTEMS AND METHODS FOR TIME-BASED SHARING OF A TRACKED LOCATION WITHIN A SOCIAL NETWORKING SYSTEM

(71) Applicant: Facebook, Inc., Menlo Park, CA (US)

(72) Inventor: Jordan Springstroh, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 16/664,655

(22) Filed: Oct. 25, 2019

(65) Prior Publication Data
US 2021/0126889 A1   Apr. 29, 2021

(51) Int. Cl.
| | | |
|---|---|---|
| *H04L 12/58* | (2006.01) | |
| *H04W 8/22* | (2009.01) | |
| *H04W 4/029* | (2018.01) | |

(52) U.S. Cl.
CPC ............. *H04L 51/32* (2013.01); *H04L 51/20* (2013.01); *H04W 4/029* (2018.02); *H04W 8/22* (2013.01)

(58) Field of Classification Search
CPC .......... H04L 51/32; H04L 51/20; H04W 8/22; H04W 4/029
See application file for complete search history.

(56) References Cited

U.S. PATENT DOCUMENTS

| | | | | |
|---|---|---|---|---|
| 8,589,808 | B1* | 11/2013 | Alfaro | G06Q 10/1095 715/753 |
| 2012/0246089 | A1* | 9/2012 | Sikes | H04M 1/72536 705/325 |
| 2014/0019184 | A1* | 1/2014 | Herickhoff | G06Q 50/265 705/7.19 |
| 2014/0256350 | A1* | 9/2014 | Booking | H04W 4/029 455/456.1 |
| 2014/0279066 | A1* | 9/2014 | Louis | H04L 51/02 705/14.73 |
| 2017/0339162 | A1* | 11/2017 | Singh | G06Q 50/01 |
| 2018/0006994 | A1* | 1/2018 | Baldwin | G06Q 30/02 |
| 2018/0176362 | A1* | 6/2018 | Cohen | H04M 3/53375 |
| 2018/0241827 | A1* | 8/2018 | Haney | H04W 4/021 |
| 2019/0082301 | A1* | 3/2019 | Rusu | H04W 4/029 |

* cited by examiner

*Primary Examiner* — Caroline H Jahnige
(74) *Attorney, Agent, or Firm* — FisherBroyles, LLP

(57) ABSTRACT

The disclosed computer-implemented method may include receiving, via a user interface of a social networking system (SNS) (1) a request to include a user of the SNS in a set of users of the SNS, and (2) a time frame associated with an event The method may also include including the user in the set of users based on receiving the request to include the user in the set of users. The method may also include tracking, via a location tracking feature of a mobile device associated with a target user of the SNS, a physical location of the target user during the time frame, and sharing, via the SNS during the time frame, the physical location of the target user with the set of users. Various other methods, systems, and computer-readable media are also disclosed.

20 Claims, 11 Drawing Sheets

SYSTEMS AND METHODS FOR TIME-BASED SHARING OF A TRACKED LOCATION WITHIN A SOCIAL NETWORKING SYSTEM

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
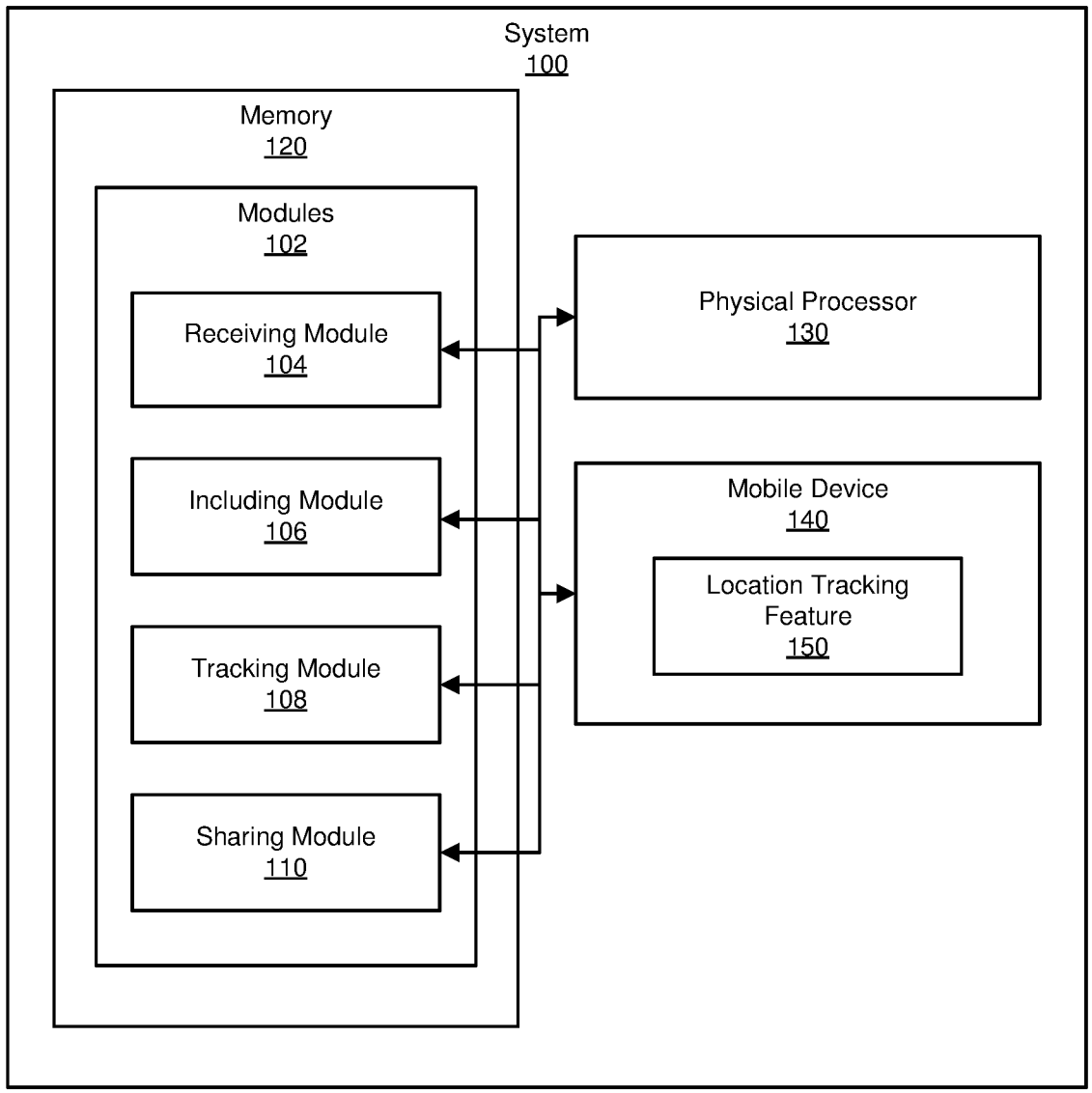
FIG. 1 is a block diagram of an example system for time-based sharing of a tracked location within a social networking system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Modern social networking systems have revolutionized how people connect to and communicate with each other. For example, users of a social networking system may share information (e.g., posts, news stories, media, etc.) with other users, may join groups that include other users who share common interests, and so forth.

Unfortunately, it may be difficult to transition such virtual connections to the real world. For example, meeting a new social networking connection in person, such as for a business meeting, a social interaction (e.g., a date), and so forth may present a myriad of safety concerns. Such safety concerns may cause even highly compatible users to avoid meeting each other in real life, which may limit or inhibit a type or scope of interpersonal connections between users of a social networking system.

Hence, the instant application identifies and addresses a need for additional systems and methods for facilitating real-life interactions of users of social networking systems.

The present disclosure is generally directed to systems and methods for time-based sharing of a tracked location within a social networking system. As will be explained in greater detail below, embodiments of the instant disclosure may receive, via a user interface of a social networking system (a) a request to include a user of the social networking system in a set of users of the social networking system, and (b) a time frame associated with an event. In some examples, the user may be a friend or other connection of a target user within the social networking system, and the time frame associated with the event may include a time frame of an anticipated meeting of the target user and an additional user of the social networking system (e.g., a date, a business meeting, a social interaction, etc.).

An example embodiment may include the user in the set of users based on receiving the request to include the user in the set of users. In some examples, an embodiment may additionally present a query (e.g., via a social networking interface presented to the user) whether the user agrees to be included in the set of users, and may include the user in the set of users further based on receiving an indication that the user agrees to be included in the set of users.

Furthermore, an example embodiment may track, via a location tracking feature of a mobile device associated with a target user of the social networking system (e.g., a location tracking feature of a mobile telephone, a tablet computer, a smart device, etc.), a physical location of the target user during the time frame, and may share, via the social networking system during the time frame, the physical location of the target user with the set of users. In this way, the set of users (e.g., selected friends of the target user) may monitor the physical location of the target user during the anticipated meeting of the target user with the additional user of the social networking system. Among other benefits, this may alleviate some safety concerns of the target user and/or the set of users that may be associated with the target user and the additional user meeting each other in real life.

The following will provide, with reference to FIGS. 1-2 and 4-11, detailed descriptions of systems for time-based sharing of a tracked location within a social networking system. Detailed descriptions of corresponding computer-implemented methods will also be provided in connection with FIG. 3.

FIG. 1 is a block diagram of an example system 100 for time-based sharing of a tracked location within a social networking system. As illustrated in this figure, example system 100 may include one or more modules 102 for performing one or more tasks. As will be explained in greater detail below, modules 102 may include a receiving module 104 that may receive, via a user interface of a social networking system (a) a request to include a user of the social networking system in a set of users of the social networking system, and (b) a time frame associated with an event, Example system may also include an including module 106 that may include the user in the set of users based on receiving the request to include the user in the set of users. Additionally, example system 100 may include a tracking module 108 that may track, via a location tracking feature of a mobile device associated with a target user of the social networking system, a physical location of the target user during the time frame, and a sharing module 110 that may share, via the social networking system during the time frame, the physical location of the target user with the set of users.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further shown in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate time-based sharing of a tracked location within a social networking system. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Additionally, example system 100 may include a mobile device 140 that may further include a location tracking feature 150. Mobile device 140 generally represents any type or form of computing device capable of reading and/or executing computer-executable instructions. In at least one embodiment, mobile device 140 may accept one or more directions from one or more servers and/or user devices. Examples of mobile device 140 may include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

As will be described in greater detail below, a location tracking feature (e.g., location tracking feature 150) may include any suitable device, service, system, combinations of one or more of the same, and so forth that may identify, track, and/or localize a location of mobile device 140 within a predetermined margin of error. By way of example, and without limitation, a location tracking feature may include a global positioning system (GPS) (e.g., a GPS receiver), a cell tower triangulation system, a wireless local area networking hotspot location system, a hybrid positioning system, combinations of one or more of the same, and so forth.

Figure 2:
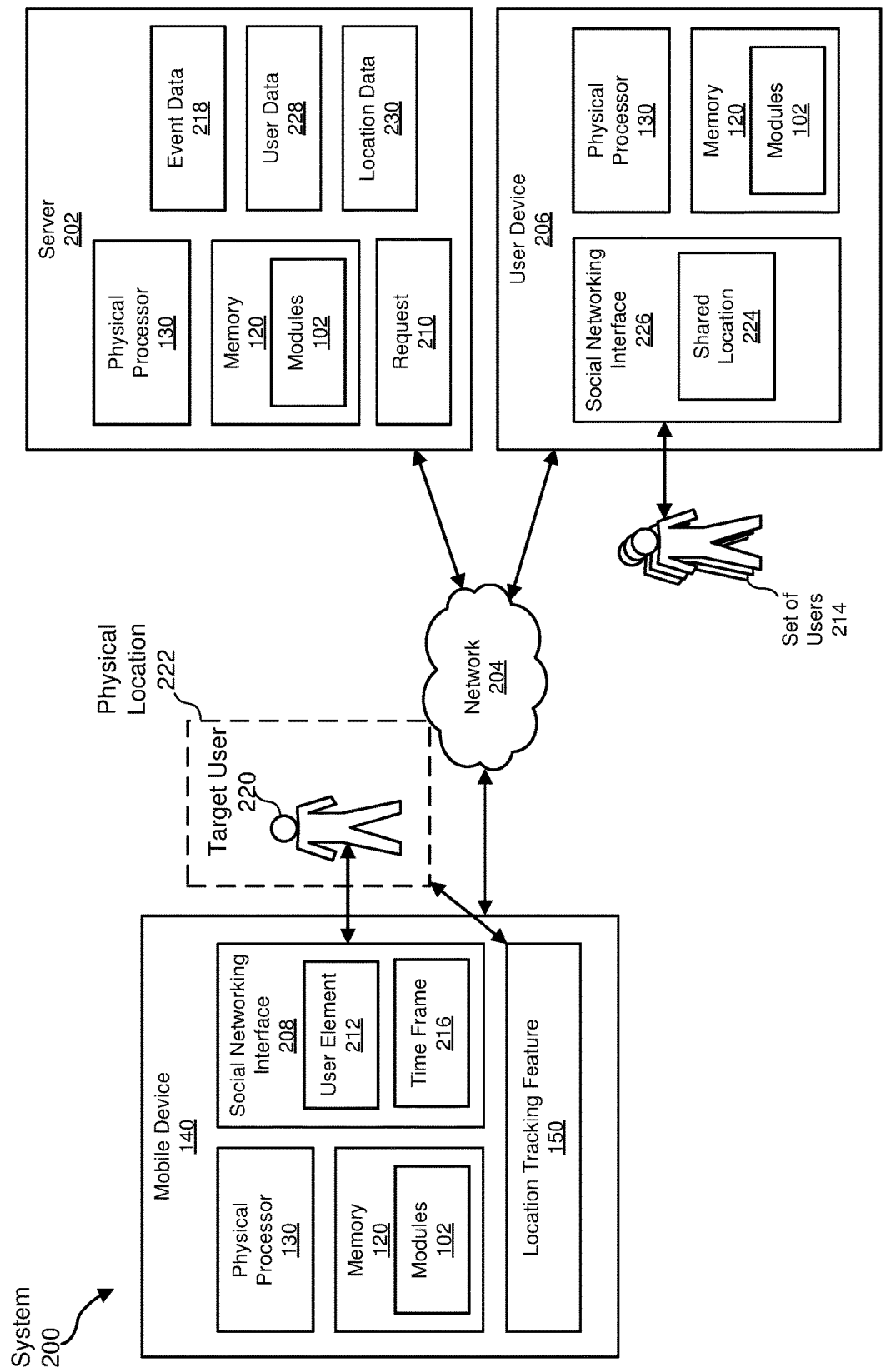
FIG. 2 is a block diagram of an example implementation of a system for time-based sharing of a tracked location within a social networking system.

Example system 100 in FIG. 1 may be implemented in a variety of ways. For example, all or a portion of example system 100 may represent portions of an example system 200 ("system 200") in FIG. 2. As shown in FIG. 2, system 200 may include mobile device 140 in communication with a server 202 and a user device 206 via a network 204. In at least one example, mobile device 140 may be programmed with one or more of modules 102. Additionally or alternatively, server 202 and/or user device 206 may be programmed with one or more of modules 102.

In at least one embodiment, one or more modules 102 from FIG. 1 may, when executed by mobile device 140, server 202, and/or user device 206, cause mobile device 140, server 202, and/or user device 206 to perform one or more operations to enable time-based sharing of a tracked location within a social networking system. For example, as will be described in greater detail below, receiving module 104 may cause mobile device 140, server 202, and/or user device 206 to receive, via a user interface of a social networking system (e.g., social networking interface 208), (a) a request (e.g., request 210) to include a user of the social networking system (e.g., via user element 212) in a set of users of the social networking system (e.g., set of users 214), and (b) a time frame (e.g., time frame 216) associated with an event (e.g., an event included and/or described in event data 218). Additionally, including module 106 may cause mobile device 140, server 202, and/or user device 206 to include the user in the set of users based on receiving the request to include the user in the set of users.

Furthermore, tracking module 108 may cause mobile device 140, server 202, and/or user device 206 to track, via a location tracking feature (e.g., location tracking feature 150) of a mobile device (e.g., mobile device 140) associated with a target user of the social networking system (e.g., target user 220), a physical location of the target user (e.g., physical location 222) during the time frame. Additionally, sharing module 110 may cause mobile device 140, server 202, and/or user device 206 to share, via the social networking system during the time frame, the physical location of the target user (e.g., shared location 224) with the set of users (e.g., via social networking interface 226).

Server 202 generally represents any type or form of computing device capable of reading and/or executing computer-executable instructions and/or hosting executables. Examples of server 202 include, without limitation, application servers, storage servers, database servers, web servers, and/or any other suitable computing device configured to run certain software applications and/or provide various application, storage, and/or database services. In some examples, server 202 may host, store, and/or be capable of accessing user data 228, event data 218, and location data 230. As will be described in greater detail below, user data 228 may include any data associated with one or more users of a social networking system, event data 230 may include any data associated with one or more events, and location data 230 may include any data associated with one or more locations. Although shown in FIG. 2 as part of server 202, user data 228, event data 230, and/or location data 230 may be stored, maintained, and/or located within any suitable data storage system, such as one or more portions of memory 120. Hence, part or all of user data 228, event data 230, and/or location data 230 may be stored, maintained, and/or accessed by and/or from any or all of mobile device 140, server 202, and/or user device 206.

Network 204 generally represents any medium or architecture capable of facilitating communication and/or data transfer between mobile device 140, server 202, and/or user device 206. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, proprietary data connections, and the like. Network 204 may facilitate communication or data transfer using wireless or wired connections. In at least one embodiment, network 204 may facilitate communication between mobile device 140, server 202, and user device 206.

Like mobile device 140, user device 206 generally represents any type or form of computing device capable of reading and/or executing computer-executable instructions. In at least one embodiment, user device 206 may accept one or more directions from mobile device 140 and/or server 202. Examples of user device 206 include, without limitation, servers, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device. In at least one example, user device 206 may present an interface of a social networking system (e.g., social networking interface 226) to one or more users (e.g., one or more users included in set of users 214).

In at least one example, mobile device 140, server 202, and user device 206 may be computing devices programmed with one or more of modules 102. All or a portion of the functionality of modules 102 may be performed by mobile device 140, server 202, user device 206, and/or any other suitable computing system. As will be described in greater detail below, one or more of modules 102 from FIG. 1 may, when executed by at least one processor of mobile device 140, server 202, and/or user device 206, enable mobile device 140, server 202, and/or user device 206 to share, with a set of users selected by a user, a tracked location of a mobile device associated with a target user during a time frame.

Figure 3:
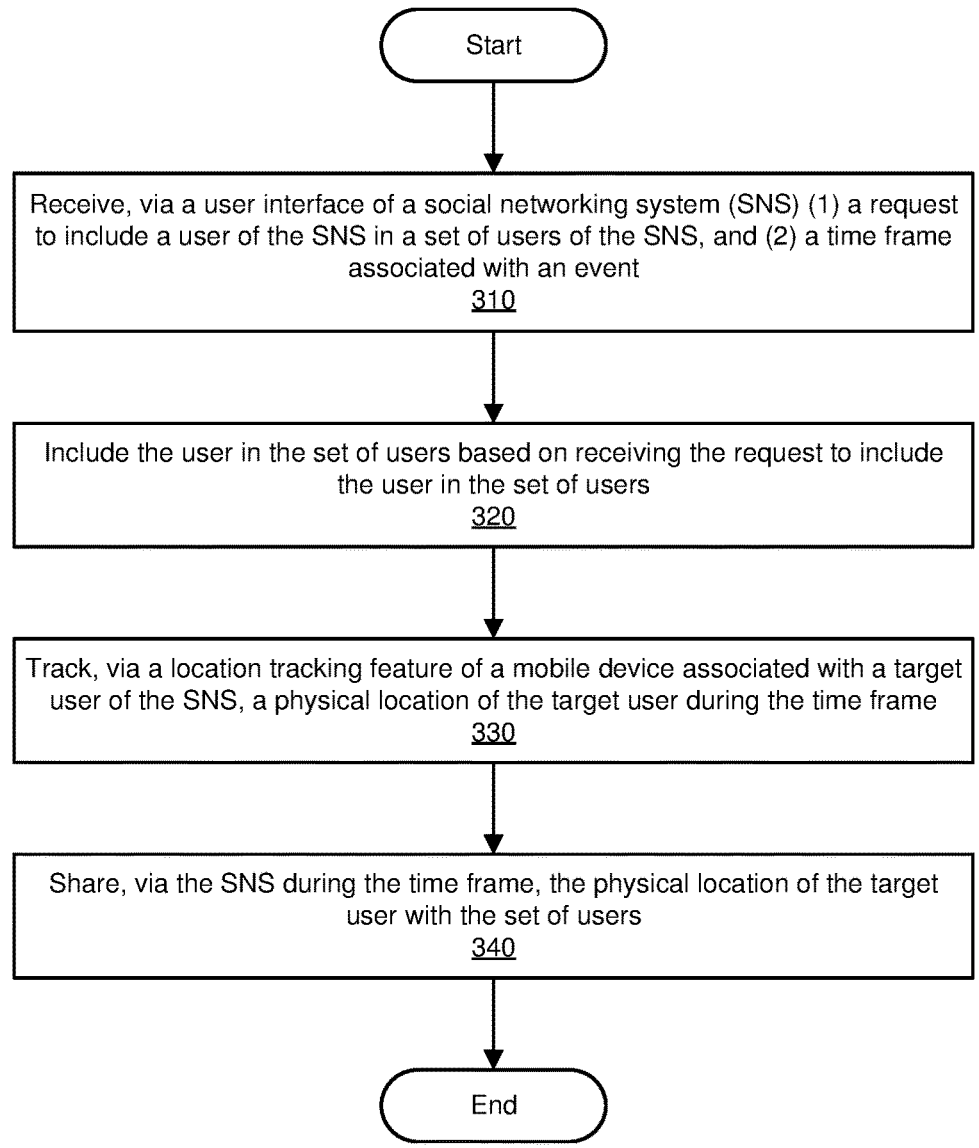
FIG. 3 is a flow diagram of an example method for time-based sharing of a tracked location within a social networking system.

FIG. 3 is a flow diagram of an example computer-implemented method 300 for allocating shared resources in multi-tenant environments. The steps shown in FIG. 3 may be performed by any suitable computer-executable code and/or computing system, including example system 100 in FIG. 1, example system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may receive, via a user interface of a social networking system (a) a request to include a user of the social networking system in a set of users of the social networking system, and (b) a time frame associated with an event. For example, receiving module 104 may, as part of mobile device 140, server 202, and/or user device 206, cause mobile device 140, server 202, and/or user device 206 to receive, via a social networking interface 208 (a) request 210 to include a user of the social networking system (e.g., a user represented by a user element 212 included in social networking interface 208) in set of users 214, and (b) time frame 216 associated with an event (e.g., an event included in and/or described by event data 218).

In some examples, a "request" may include any information that indicates that a target user of a social networking system, such as target user 220, desires to include a user of the social networking system in a set of users of the social networking system with whom the target user wishes to share his or her physical location during a particular time frame, such as time frame 216. For example, request 210 may include an instruction for one or more of the systems described herein (e.g., one or more of modules 102) to include at least one particular user in set of users 214. In some examples, a request (e.g., request 210) may further include, without limitation, a message from the target user to the user, a listing of other users the target user has requested to be included in set of users 214, a listing of other users who have accepted a request to be included in set of users 214, the particular time frame during which the target user wishes to share his or her location with set of users 214 (e.g., time frame 216), a description of an event associated with the particular time frame, a location (e.g., a physical location) associated with the particular time frame, and so forth.

Furthermore, in some examples, an "event" may include any particular or identifiable occurrence, such as an in-person meeting of two or more persons, a social event or gathering, a business meeting or gathering, and so forth. An event may be associated with a time frame. For example, an event may include a pre-planned, in-person meeting of a target user of a social networking system (e.g., target user 220) and an additional person during a particular time frame (e.g., from a first date and time to a second date and time). As an illustration, an event may include a social meeting (e.g., a date) between target user 220 and an additional person at a predetermined time and/or during a predetermined time frame (e.g., 7:00 PM on Jan. 1, 2020, during one hour following 7:00 PM on Jan. 1, 2020, from 7:00 PM to 8:00 PM on Jan. 1, 2020, etc.).

Receiving module 104 may receive request 210 and time frame 216 in a variety of contexts. For example, receiving module 104 may present, via a user interface of a social networking system such as social networking interface 208, a notification that a target user (e.g., target user 220) may share his or her physical location during a time period with one or more additional users (e.g., set of users 214). Receiving module 104 may receive an input that may indicate that the target user desires to share his or her location during the time period with one or more additional users, and may then present a user interface element that may enable the target user to designate or select one or more users of the social networking system (e.g., user element 212). Additionally, the user interface may include one or more interactive interface elements that may enable the target user to enter a time frame (e.g., time frame 216) during which the target user may desire to share his or her location with a set of users of the social networking system (e.g., set of users 214).

Figure 4:
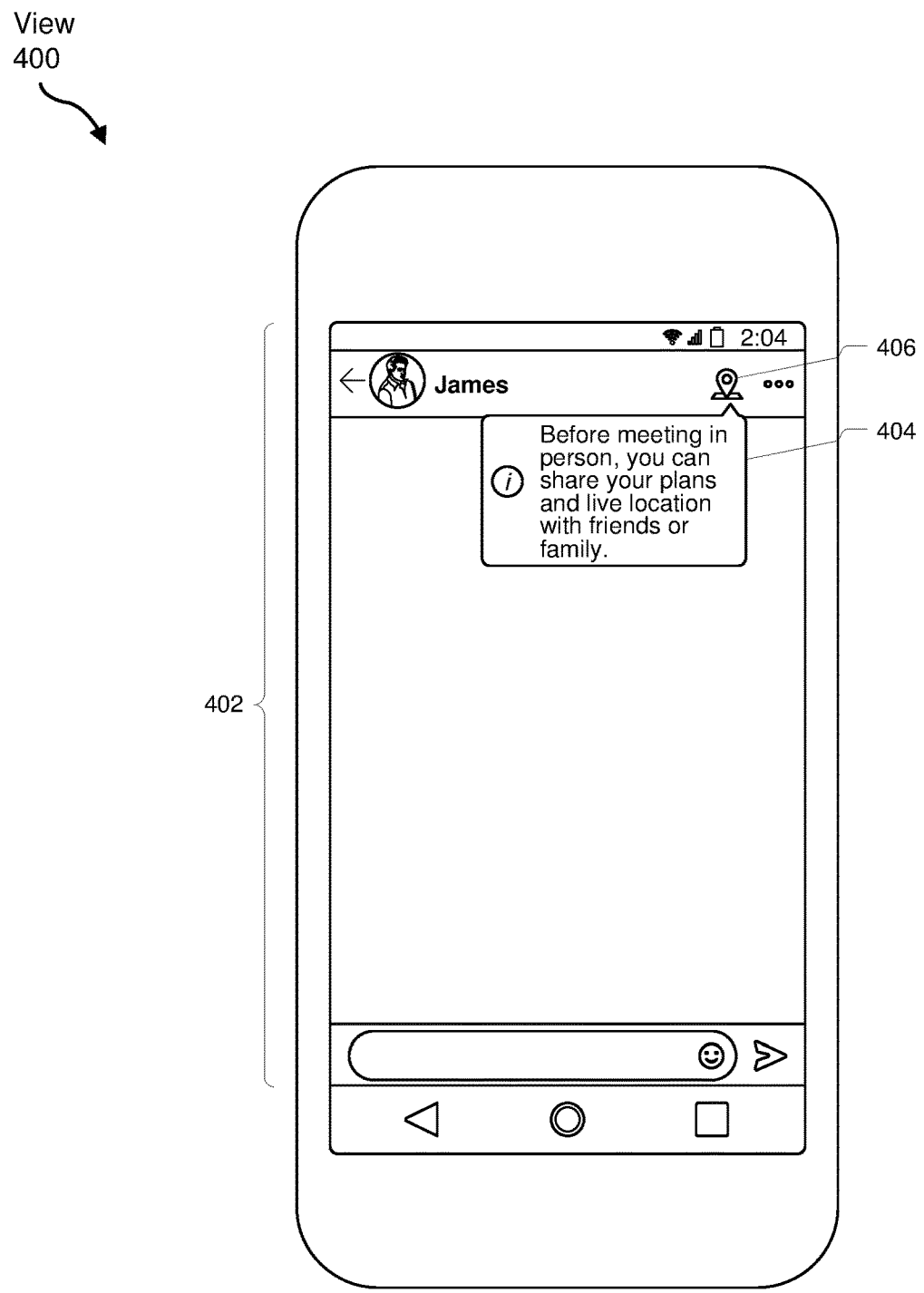
FIGS. 4-9 are examples of user interfaces of a social networking system that may receive (1) a request to include a user of a social networking system in a set of users of the social networking system and (2) a time frame associated with an event in accordance with some embodiments described herein.

By way of illustration, FIG. 4 shows an example user interface view 400 that may be presented via a display device (e.g., a display device included in mobile device 140). User interface view 400 may be a user interface of a social networking system and may include various interface elements that may enable a user to interact with various features of the social networking system. As shown, user interface view 400 includes a messaging interface 402 that may represent a messaging or chat interface of the social networking system.

In some examples, user interface view 400 and/or messaging interface 402 may be included in a dating interface of a dating service of the social networking system. A dating service of a social networking system may be any service of a social networking system that manages dating connections and/or shares, compiles, formats, and/or broadcasts information based on dating connections.

In user interface view 400, a target user (e.g., target user 220) may be communicating, via a messaging or chat service of the social networking system, with an additional user named James. In some examples, at least one of the target user and additional user James may be a participant in a dating service of the social networking system.

The target user may have agreed to a plan to meet James in person (e.g., at a real-world or physical location). One or more of modules 102 (e.g., receiving module 104) may detect or determine that the target user has agreed to the planned meeting, and may present a notification 404 that may notify the user that he or she may share his or her plans and live location with a set of users of the social networking system (e.g., friends, family, acquaintances, etc.). User interface view 400 may further include a location tracking interface affordance 406 that, when selected by a user (e.g., target user 220), may cause receiving module 104 to receive an input that may indicate that the target user desires to share his or her location during the time period with one or more additional users.

Figure 5:
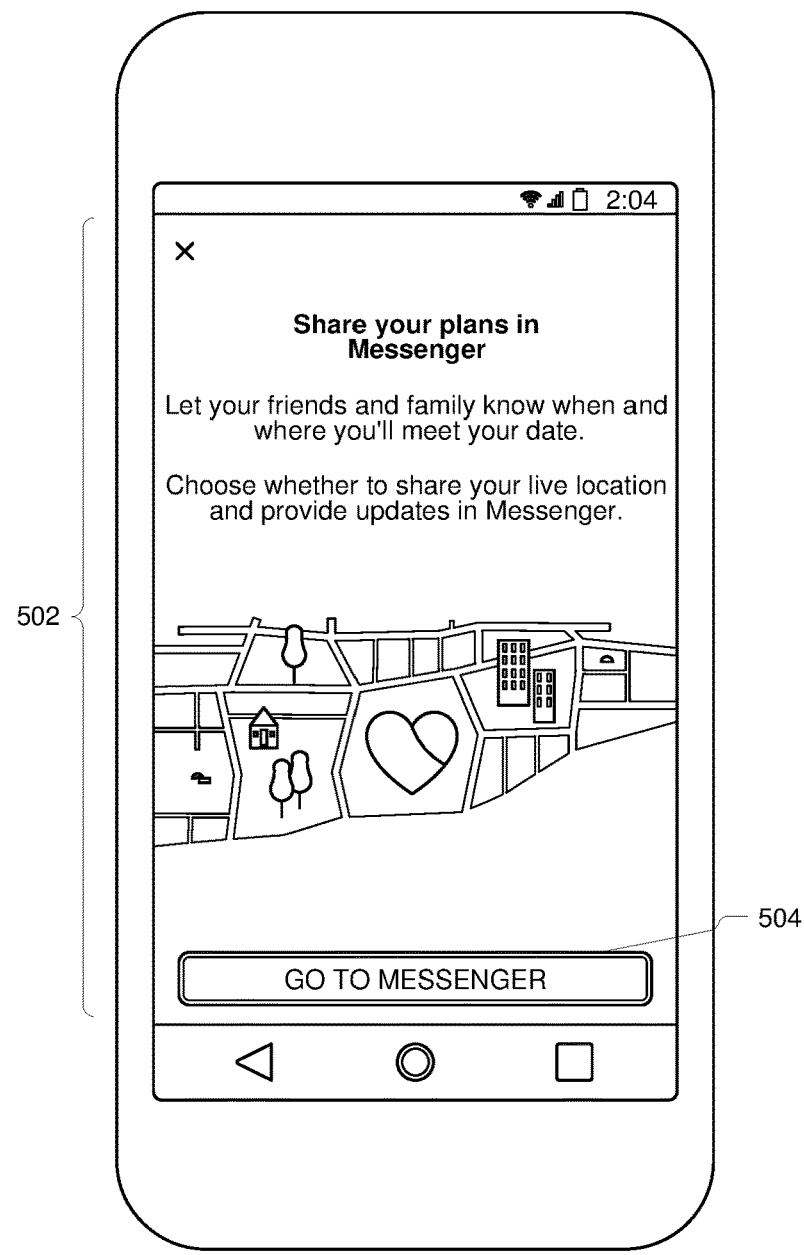

FIG. 5 shows a user interface view 500 that may also enable a user to indicate that he or she desires to share his or her location during a time period with one or more additional users. Receiving module 104 may detect or determine that the target user has agreed to the planned meeting, and may present a notification 502 that may notify the user that he or she may share his or her plans and live location with a set of users of the social networking system (e.g., friends, family, acquaintances, etc.). User interface view 500 may further include a button 504 that, when selected by a user (e.g., target user 220), may cause receiving module 104 to receive an input that may indicate that the target user desires to share his or her location during the time period with one or more additional users.

Upon receiving an input that may indicate that the target user desires to share his or her location during the time period with one or more additional users, one or more of modules 102 (e.g., receiving module 104, including module 106, etc.) may present a user interface that may include an interactive user interface element that may enable the target user to designate or select one or more users of the social networking system (e.g., user element 212). Additionally, the user interface may include one or more interactive interface elements that may enable the target user to enter a time frame (e.g., time frame 216) during which the target user may desire to share his or her location with a set of users of the social networking system (e.g., set of users 214).

Figure 6:
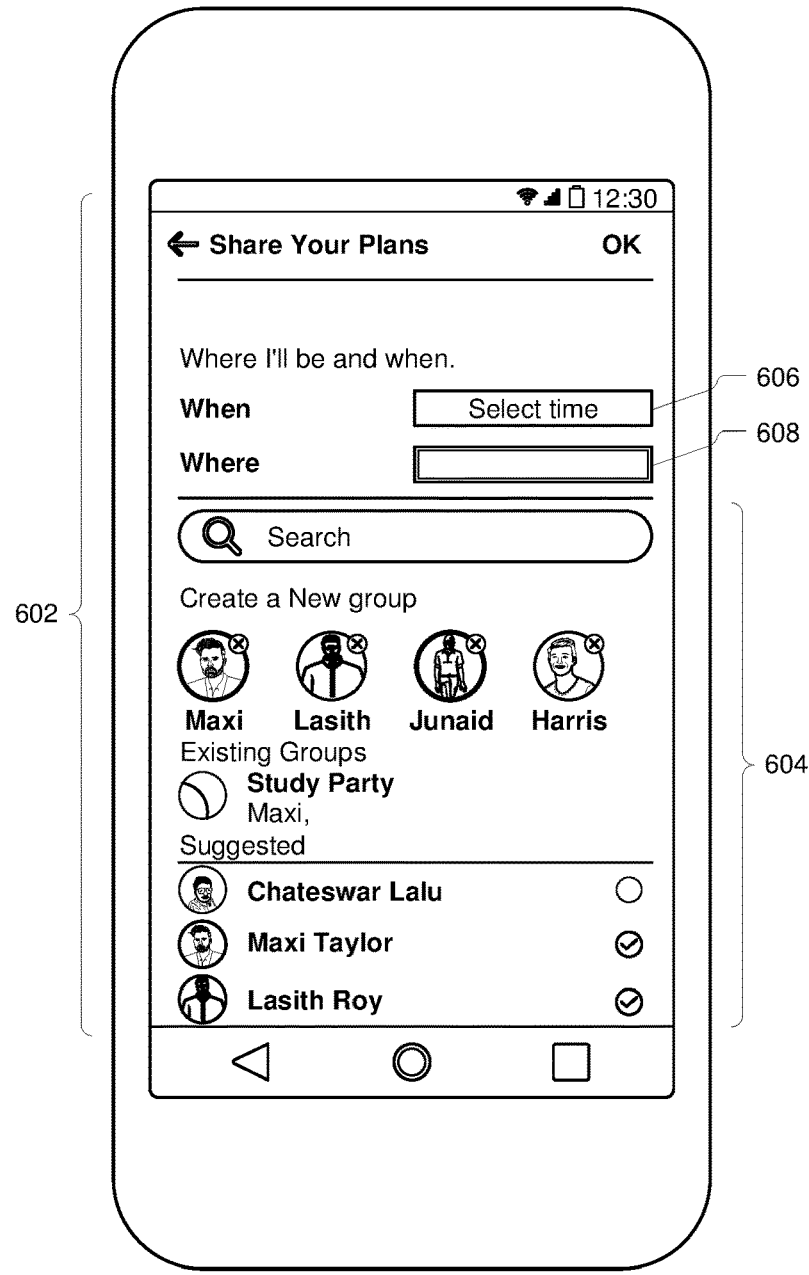

As an illustration, FIG. 6 shows a user interface view 600 that may include one or more interactive interface elements that may enable a user (e.g., target user 220) to indicate one or more additional users that the user may desire to share his or her location with during a particular time frame. As shown, user interface view 600 may include a time-based location sharing interface 602 that may further include a user selection interface element 604 and a time frame selection element 606. A user may interact with user selection interface element 604 to identify and/or select one or more additional users of the social networking system (e.g., "friends" of the user). User selection interface element 604 may include various functions that may enable a user to identify and/or select one or more additional users. For example, as shown, user selection interface element 604 may include a graphical representation of one or more friends of the user within the social networking system. A user may select (e.g., touch, click on, highlight, etc.) one or more graphical representations of one or more friends, which may then cause receiving module 104 to visually indicate that the user has indicated a desire to include the selected friend in a group of users with whom to share a location of the user during a time frame.

Additionally, user selection interface element 604 may include a search interface that may enable the user to search through users of the social networking system and/or friends of the user within the social networking system. User selection interface element 604 may also include and/or show one or more existing groups of users of the social networking system that the user may already belong to (e.g., a "Study Party" icon included in user selection interface element 604). Additionally or alternatively, receiving module 104 may select, from a set of friends of a user within the social networking system, based on any suitable criteria one or more friends of the user that the user may wish to share his or her location with, and may present the one or more friends within a "Suggested" portion of user interface element 604. As indicated by the check marks next to their names in user selection interface element 604, a user (e.g., target user 220) has selected users "Maxi Taylor" and "Lasith Roy" to share his or her location with during a time frame. It may also be apparent that the user has not selected user "Chateswar Lalu," as indicated by a lack of a check mark next to that name.

In some examples, one or more of modules 102 (e.g., receiving module 104, including module 106, etc.) may identify, from a set of users associated with the target user, one or more users to include in the user selection interface element 604, and may include the identified users in user selection interface element 604. One or more of modules 102 may identify users to include in user selection interface element 604 in any suitable way. For example, receiving module 104 may identify users that the target user has previously shared his or her location with during a previous event. Additionally or alternatively, receiving module 104 may identify users that the target user has engaged in conversations (e.g., via a messaging function of the social networking system) regarding meeting other users in person (e.g., dates, business meetings, etc.).

As mentioned above, time-based location sharing interface 602 may also include a time frame selection element 606. A user (e.g., target user 220) may interact with time frame selection element 606 to indicate, identify, and/or select a time frame during which he or she desires to share his or her location with a selected set of users (e.g., set of users 214). Receiving module 104 may then receive, via time frame selection element 606 of time-based location sharing interface 602, the indicated, identified, and/or selected time frame (e.g., as time frame 216). In some examples, receiving module 104 may receive the time frame associated with the event by inferring and/or selecting a time frame associated with the event (e.g., 1 minute, 10 minutes, 1 hour, etc.). For example, a user may select a start time for an event and receiving module 104 may infer and/or select a time frame of one hour for the event.

Hence, in some examples, receiving module 104 may receive, via time-based location sharing interface 602, (1) request 210 that may include a request (e.g., a request from target user 220) to include one or more users of the social networking system in set of users 214, and time frame 216 that may be associated with one or more events (e.g., one or more events included in and/or represented by event data 218).

In some examples, an event may be further associated with a physical location (also an "event location" herein). A physical location or event location may be expressed in any suitable way. For example, a physical location may include a physical address, one or more map coordinates, one or more global positioning system (GPS) coordinates, a predetermined range surrounding a location (e.g., within n meters surrounding one or more GPS coordinates), and so forth.

In some embodiments, one or more of the systems described herein (e.g., one or more of modules 102) may determine an event location associated with an event, such as an event associated with time frame 216. For example, as shown in FIG. 6, time-based location sharing interface 602 may, in some embodiments, include a location entry element

608. Location entry element 608 may enable a user (e.g., target user 220) to enter, indicate, identify, and/or select a location associated with an event. Target user 220 may interact with location entry element 608 to indicate an event location associated with a time frame (e.g., a time frame selected via time frame selection element 606). Hence, one or more of modules 102 (e.g., receiving module 104) may determine an event location associated with an event by receiving information representative of the event location via location entry element 608 included in time-based location sharing interface 602.

Additionally or alternatively, one or more of the systems described herein (e.g., one or more of modules 102) may determine an event location associated with an event by identifying the event location from a set of predefined event data associated with the event. For example, event data 218 may include predefined data associated with and/or descriptive of an event, such as an event location, a time frame, one or more expected and/or invited attendees, and so forth. One or more of modules 102 (e.g., receiving module 104) may determine an event location by accessing event data 218 and identifying a location included in predefined event data associated with the event included in event data 218.

Figure 7:
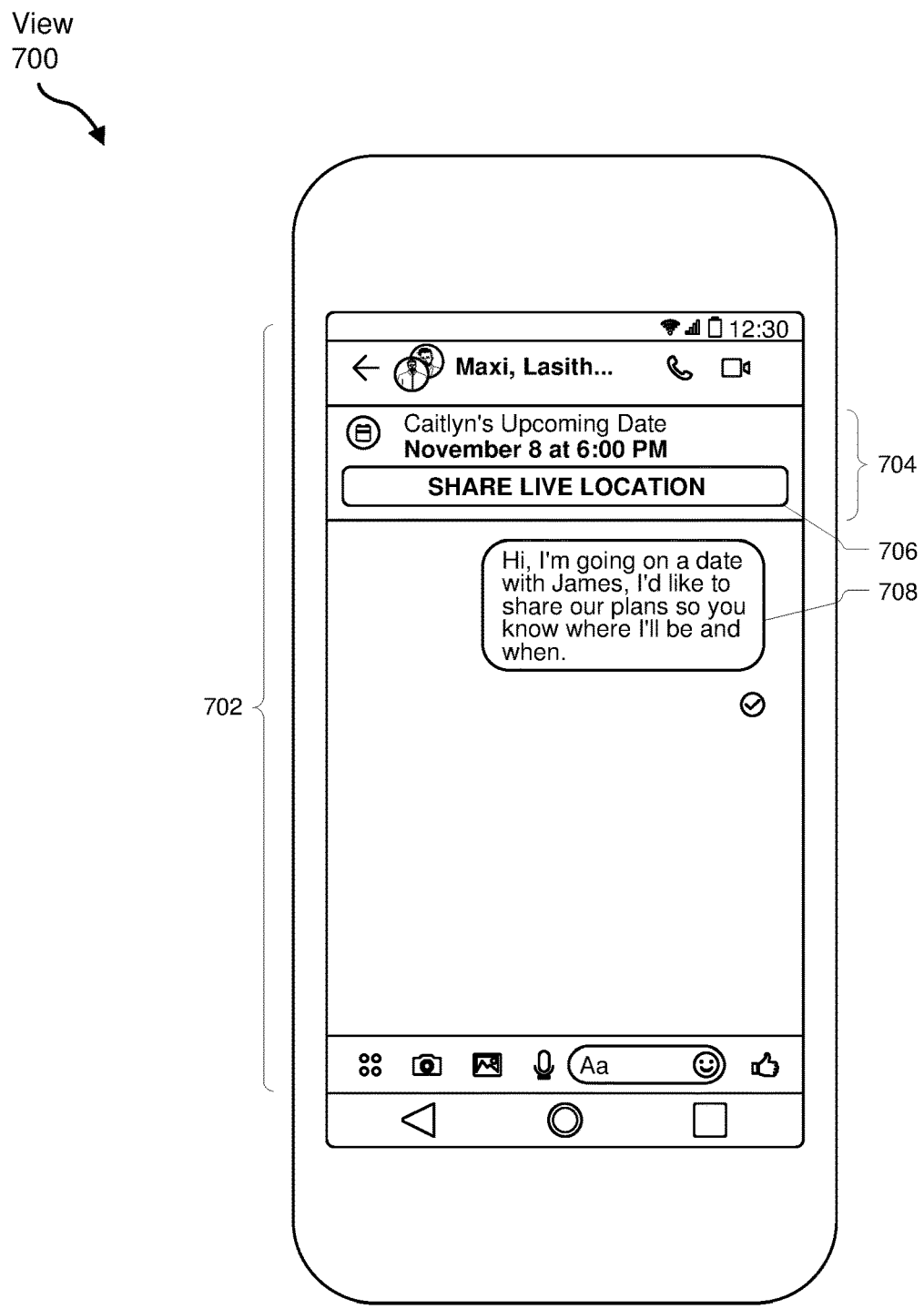

Receiving module 104 may present a variety of additional or alternative user interface views that may enable receiving module 104 to receive request 210 and time frame 216. For example, FIG. 7 shows a user interface view 700 that includes a messaging interface 702. As with messaging interface 402 described in greater detail above, messaging interface 702 may represent a messaging or chat interface of the social networking system. However, in FIG. 7, a user (e.g., target user 220) may be engaged in an exchange of messages (e.g., a message chain, group text, etc.) that may include or involve a set of users that the user has selected to include in the exchange of messages. As shown, the message exchange may involve or include at least the users "Maxi," "Lasith," and "Caitlyn," where Caitlyn is a user who has agreed to meet user "James" for a date on November 8 at 6:00 PM.

In this example, receiving module 104 may have determined (e.g., by accessing event data 218 and/or by receiving event data via a suitable user interface) that user Caitlyn has agreed to meet user James on November 8 at 6:00 PM. Furthermore, receiving module 104 may also have determined that user Caitlyn may desire to share her location with the set of users included in messaging interface 702. For example, the users included in the exchange of messages shown in messaging interface 702 may be a set of users pre-selected by Caitlyn for location sharing when Caitlyn agrees to meet other users of the social networking system in person. In response to these determinations, receiving module 104 may cause messaging interface 702 to show meeting information 704 that may include information about Caitlyn's upcoming meeting with James, as well as a sharing control 706. Additionally or alternatively, receiving module 104 may show meeting information 704 and/or sharing control 706 within any or all interfaces of the social media network upon detecting and/or determining that a suitable event is occurring within a suitable period of time (e.g., one hour, one day, one week, etc.).

When a user (e.g., target user 220, user Caitlyn, etc.) interacts with (e.g., touches, clicks on, points to, selects, etc.) sharing control 706, receiving module 104 may receive the set of users included in messaging interface 702 (e.g., users Maxi and Lasith) as a request (e.g., request 210) to include those users in set of users 214. Likewise, receiving module 104 may receive a suitable time frame associated with the event (e.g., a predetermined time frame surrounding November 8 at 6:00 PM) as time frame 216. Furthermore, as will be described in greater detail below, the selection of sharing control 706 may cause receiving module 104 to present query message 708 via an additional user interface of the social networking system (e.g., social networking interface 226 presented via user device 206) that may request permission or confirmation from users included in messaging interface 702 and/or request 210.

Figure 8:

As an additional example, FIG. 8 shows a user interface view 800 that may enable time-based sharing of a tracked location within a social networking system. As shown, user interface view 800 may include a lock screen interface 802 of a mobile device (e.g., mobile device 140) that may be capable of presenting notifications from a social networking system.

One or more of modules 102 (e.g., receiving module 104) may access event data 218 and may determine that a start time associated with an event associated with target user 220 is approaching (e.g., the event may be scheduled to occur within a predetermined time following the time shown in user interface view 800) or has occurred (e.g., user interface view 800 may be presented before, during, or after time frame 216). Furthermore, one or more of modules 102 (e.g., receiving module 104) may determine and/or select a set of users with whom user may wish to share his or her location with during the time frame associated with the event in any of the ways described herein. For example, as described above, user Caitlyn may have discussed her plans to meet user James with users Maxi and Lasith via a messaging feature and/or interface of the social networking system.

Hence, one or more of modules 102 (e.g., receiving module 104) may present, via lock screen interface 802 and/or any other suitable notification interface, a notification 804 that may remind user Caitlyn that she may choose to share her location during the time frame of the approaching event with users Maxi and Lasith. User Caitlyn (e.g., target user 220) may interact with (e.g., touch, click on, select, etc.) notification 804, which may cause receiving module 104 to receive an input. In response, receiving module 104 may receive a time frame associated with the approaching event as time frame 216 and one or more users shown in notification 804 as request 210. Additionally or alternatively, receiving module 104 may present any other suitable interface (e.g., user interface view 600) that may enable user Caitlyn to select another suitable time frame and/or set of users with whom to share her location during the time frame.

Figure 9:
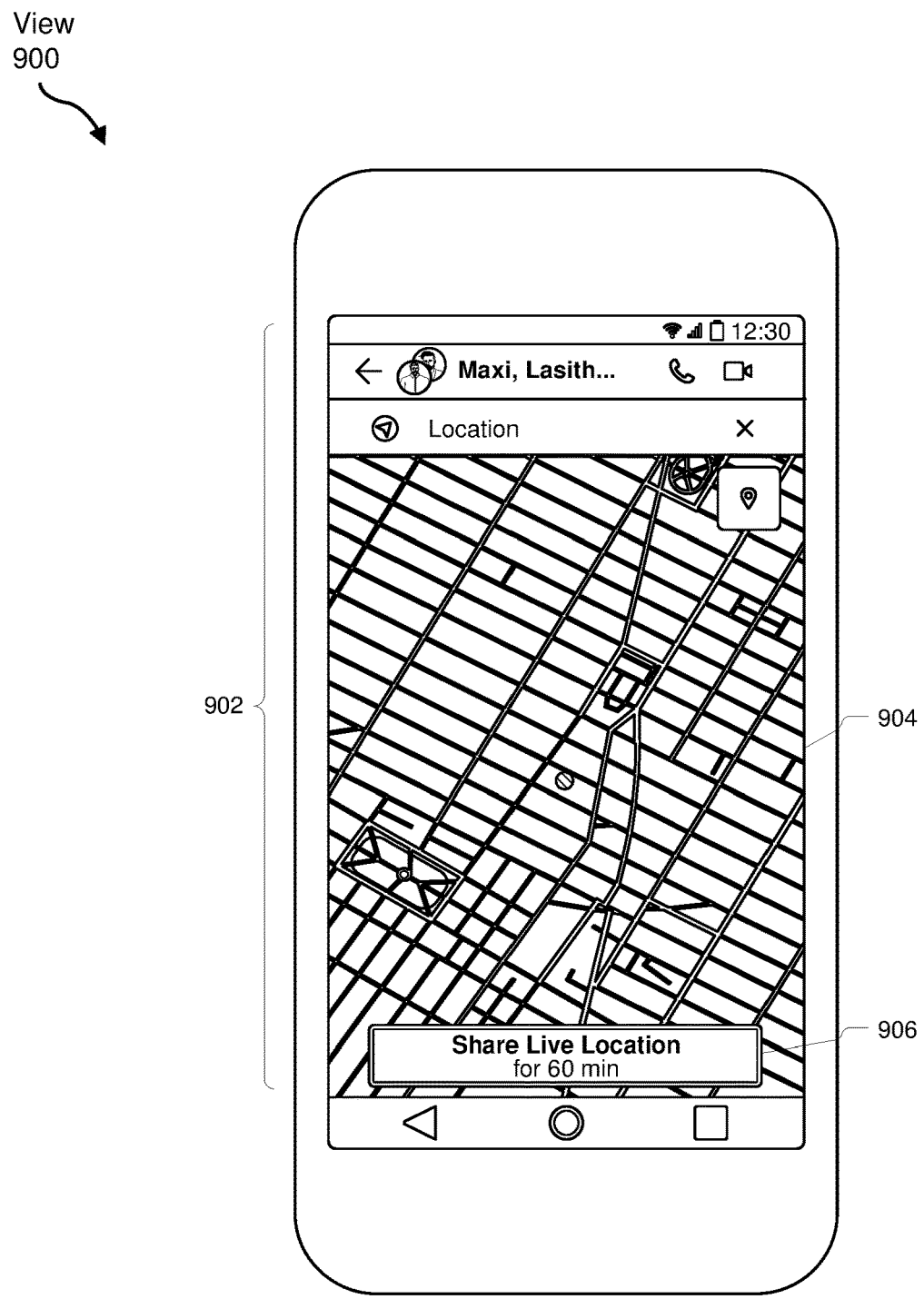

FIG. 9 shows a further example of a user interface view 900 that may enable time-based sharing of a tracked location within a social networking system. As shown, user interface view 900 may include a messaging interface 902 presented via a mobile device such as mobile device 140. In some examples, messaging interface 902 may be similar to or include elements of messaging interface 402, messaging interface 702, and so forth. As with other examples herein, target user Caitlyn may be engaged in a conversation with other users Maxi and Lasith via a messaging feature of the social networking system.

As further shown in FIG. 9, messaging interface 902 may also include a location interface 904 that may present a map view of a substantially live location of mobile device 140. One or more of modules 102 (e.g., receiving module 104) may access event data 218 and may determine that a start time associated with an event associated with target user 220 is approaching (e.g., the event may be scheduled to occur within a predetermined time following the time shown in user interface view 800) or has occurred (e.g., user interface view 800 may be presented before, during, or after time frame 216). Furthermore, one or more of modules 102 (e.g., receiving module 104) may determine and/or select a set of users with whom user may wish to share his or her location with during the time frame associated with the event in any of the ways described herein. For example, as described above, user Caitlyn may have discussed her plans to meet user James with users Maxi and Lasith via a messaging feature and/or interface of the social networking system.

Hence, one or more of modules 102 (e.g., receiving module 104) may present, via messaging interface 902, a sharing button 906. User Caitlyn (e.g., target user 220) may interact with (e.g., touch, click on, select, etc.) sharing button 906, which may cause receiving module 104 to receive an input. In response to receiving this input, receiving module 104 may receive a time frame associated with the event as time frame 216 (e.g., "60 min" as shown by sharing button 906) and one or more users shown in messaging interface 902 as request 210 (e.g., users Maxi and Lasith). Additionally or alternatively, receiving module 104 may present any other suitable interface view (e.g., user interface view 600) that may enable user Caitlyn to select another suitable time frame and/or set of users with whom to share her location during the time frame.

Returning to FIG. 3, at step 320, one or more of the systems described herein may include a user in a set of users (e.g., a set of users with whom to share a location of a target user during a time frame) based on receiving the request to include the user in the set of users. For example, including module 106 may, as part of mobile device 140, server 202, and/or user device 206, include a user in set of users 214 based on receiving module 104 receiving request 210.

In addition to including a designated or selected user in set of users 214 based on receiving request 210 that may include a request to include the designated or selected user in set of users 214, including module 106 may include the designated or selected user in set of users 214 in a variety of additional or alternative contexts. For example, including module 106 may include the designated or selected user in set of users 214 based on receiving an indication that the selected or designated user agrees to be included in set of users 214.

In some examples, one or more of modules 102 (e.g., including module 106) may present, via an additional user interface of the social networking system and in response to receiving a request to include a user in a set of users (e.g., a set of users with whom a target user wishes to share his or her location during a time frame), a query whether the user agrees to be included in the set of users. One or more of modules 102 (e.g., receiving module 104, including module 106, etc.) may receive, via the additional user interface, an indication that a selected user (e.g., a user selected by target user 220 in any of the ways described herein) agrees to be included in the set of users. Including module 106 may then include the designated or selected user in set of users 214 based on receiving the indication that the selected or designated user agrees to be included in set of users 214.

For example, upon receiving module 104 receiving a request to include a selected user in set of users (e.g., request 210) in any of the ways described herein, including module 106 may present a query whether the selected user agrees to be included in the set of users to the selected user, such as via a notification and/or messaging service of the social networking system. The selected user may interact with the additional user interface of the social networking system to indicate that he or she agrees to be included in set of users 214 and receiving module 104 and/or including module 106 may receive the indication in any suitable way, such as via the notification and/or messaging service of the social networking system.

Upon receiving module 104 and/or including module 106 receiving the indication that the selected user agrees to be in included in the set of users, including module 106 may include the selected user in set of users. However, if the selected user indicates that he or she declines to be included in set of users 214, such as by not responding to the presented query or indicating a negative response to the query, including module may omit the selected user from set of users 214. In at least these ways, the selected user may opt into or out of receiving and/or viewing the target user's shared location during the time frame.

Returning to FIG. 3, at step 330, one or more of the systems described herein may track, via a location tracking feature of a mobile device associated with a target user of the social networking system, a physical location of the target user during a time frame. For example, tracking module 108 may, as part of mobile device 140, server 202, and/or user device 206, track, via location tracking feature 150 of mobile device 140 associated with target user 220, physical location 222 of target user 220 during time frame 216.

Tracking module 108 may track physical location 222 of target user 220 during time frame 216 in a variety of contexts. For example, tracking module 108 may direct mobile device 140 to activate location tracking feature 150 at a start time of time frame 216, and may direct mobile device 140 and/or location tracking feature 150 to monitor, receive, record, trace, track, gather, and/or communicate data representative of a physical location of mobile device 140 during time frame 216 via location tracking feature 150. As mobile device 140 may be associated with (e.g., carried by, on the person of, in close proximity to, etc.) target user 220, the physical location of mobile device 140 during time frame 216 may also indicate and/or be representative of a physical location of target user 220 during time frame 216. Hence, physical location 222 may indicate and/or be representative of both a physical location of mobile device 140 and a physical location of target user 220 during time frame 216.

Tracking module 108 may further direct mobile device 140 to communicate data representative of physical location 222 to one or more of modules 102 (e.g., receiving module 104, including module 106, tracking module 108, and/or sharing module 110) included in mobile device 140, server 202, and/or user device 206. At an end time of time frame 216, tracking module 108 may further direct mobile device 140 and/or location tracking feature 150 to deactivate location tracking feature 150 and/or to cease monitoring, receiving, recording, tracing, tracking, gathering, and/or communicating data representative of physical location 222.

In some examples, tracking module 108 may determine, prior to an end of an applicable time frame (e.g., time frame 216), that a location tracking feature of a mobile device (e.g., location tracking feature 150 of mobile device 140) is disabled. This condition may inhibit other features of one or more systems described herein. Therefore, in some embodiments, (e.g., when tracking module 108 determines that location tracking feature 150 is disabled prior to an end time of time frame 216), tracking module 108 may enable (e.g., activate, actuate, engage, start, cause to become enabled, etc.) location tracking feature 150.

Tracking module 108 may enable location tracking feature 150 in a variety of contexts. For example, tracking module 108 may send an instruction to mobile device 140 that may direct mobile device 140 to enable location tracking feature 150. Additionally or alternatively, tracking module 108 may present, via the user interface of the social networking system, such as via social networking interface 208, a prompt to enable location tracking feature 150. A user (e.g., target user 220) may interact with (e.g., select, tap on, click on, etc.) the presented prompt, which may indicate that the user consents to tracking module 108 enabling location tracking feature. This user interaction may cause one or more of modules 102 (e.g., receiving module 104, tracking module 108, etc.) to receive, via the user interface of the social networking system, a user request to enable location tracking feature 150. In response to receiving the user request, one or more of modules 102 (e.g., receiving module 104, tracking module 108, etc.) may enable (e.g., activate, actuate, engage, start, cause to become enabled, etc.) location tracking feature 150. Hence, one or more of the systems described herein may enable a location tracking feature of a mobile device such that the location tracking feature may be enabled and/active during a particular time frame (e.g., time frame 216).

In additional or alternative examples, tracking module 108 may determine, after an end of an applicable time frame (e.g., time frame 216), that a location tracking feature of a mobile device (e.g., location tracking feature 150 of mobile device 140) is enabled. This condition may cause unnecessary power consumption and/or exposure of a physical location of the mobile device. Therefore, in some embodiments, (e.g., when tracking module 108 determines that location tracking feature 150 is enabled after an end time of time frame 216), tracking module 108 may disable (e.g., deactivate, disengage, cease, cause to become disabled, etc.) location tracking feature 150.

Tracking module 108 may disable location tracking feature 150 in a variety of contexts. For example, tracking module 108 may send an instruction to mobile device 140 that may direct mobile device 140 to disable location tracking feature 150. Additionally or alternatively, tracking module 108 may present, via the user interface of the social networking system, such as via social networking interface 208, a prompt to disable location tracking feature 150. A user (e.g., target user 220) may interact with (e.g., select, tap on, click on, etc.) the presented prompt, which may indicate that the user consents to tracking module 108 disabling location tracking feature 150. This user interaction may cause one or more of modules 102 (e.g., receiving module 104, tracking module 108, etc.) to receive, via the user interface of the social networking system, a user request to disable location tracking feature 150. In response to receiving the user request to disable location tracking feature 150, one or more of modules 102 (e.g., receiving module 104, tracking module 108, etc.) may disable (e.g., deactivate, disengage, cease, cause to become disabled, etc.) location tracking feature 150. Hence, one or more of the systems described herein may disable a location tracking feature of a mobile device such that the location tracking feature may be disabled and/or inactive after an end time of a particular time frame (e.g., after an end time of time frame 216).

Additionally, as will be explained in greater detail below, in some embodiments, tracking module 108 may track physical location 222 of target user 220 during time frame 216 by determining whether target user 220 is within a predefined area associated with an event location during time frame 216. For example, as described above, an event may be associated with a physical location. Tracking module 108 may determine (e.g., based on location tracking data received from location tracking feature 150) whether target user 220 is within a predefined area (e.g., within n meters of the event location, within a virtual or real barrier surrounding the event location, etc.) associated with the event location during the time frame.

Returning to FIG. 3, at step 340, one or more of the systems described herein may share, via a social networking system during the time frame, the physical location of the target user with the set of users. For example, sharing module 110 may, as part of mobile device 140, server 202, and/or user device 206, share, via a social networking system during time frame 216, physical location 222 of target user 220 with set of users 214.

Sharing module 110 may share, via a social networking system during time frame 216, physical location 222 of target user 220 with set of users 214 in a variety of contexts. For example, in some embodiments, sharing module 110 may share physical location 222 of target user 220 with set of users 214 by presenting, to set of users 214 via a tracking interface of the social networking system during time frame 216, a visual representation of the location of the target user.

Figure 10:
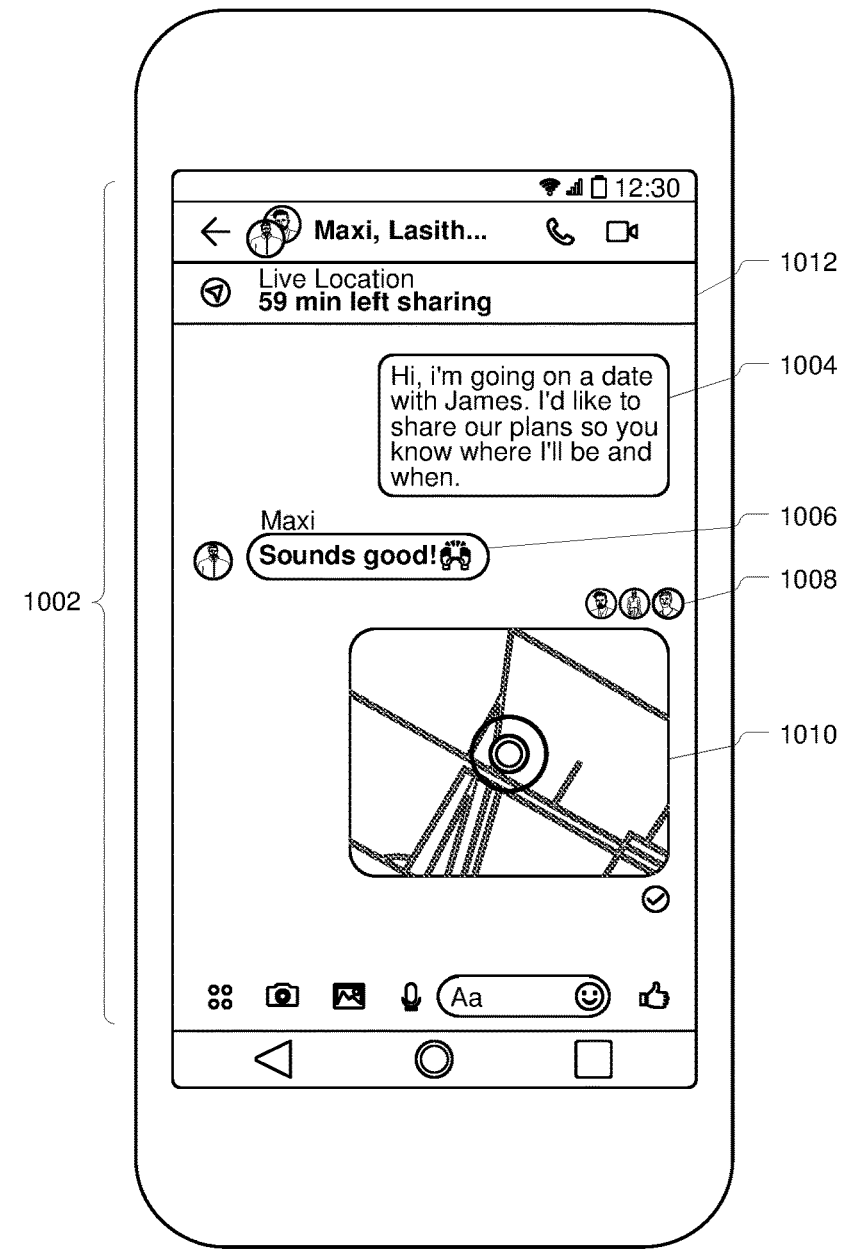
FIG. 10 is an example of a user interface of a social networking system that may share a physical location of a target user during a time frame in accordance with some embodiments described herein.

By way of illustration, FIG. 10 shows a user interface view 1000 that may include one or more interactive interface elements that may present, during time frame 216, a visual representation of physical location 222 (e.g., shared location 224) of target user 220 during time frame 216. As shown, user interface view 1000 may include a messaging interface 1002 of a social networking system that may facilitate a conversation between target user 220 and at least one user selected by target user 220 for inclusion in set of users 214. Messaging interface 1002 may include a query message 1004 that may be a query whether the user—named "Maxi" in this example—agrees to be included in set of users 214. Messaging interface 1002 may also include a response 1006 from Maxi that may be an indication that Maxi agrees to be included in set of users 214. Group element 1008 may include a graphical representation of set of users 214 (e.g., a group of users who have been selected by target user 220 for inclusion in set of users 214 and who have agreed to be included in set of users 214).

Additionally, messaging interface 1002 may include a location interface 1010 that sharing module 110 may present via messaging interface 1002 during time frame 216. In this example, location interface 1010 includes a map of an area surrounding physical location 222 as well as a location indicator that may indicate or reflect a relationship of physical location 222 to the mapped area (e.g., a position of physical location 222 within the mapped area). A user may view or observe location interface 1010 during time frame 216 to identify, view, and/or track physical location 222 of target user 220 during time frame 216.

Moreover, messaging interface 1002 may include a duration indicator 1012 that may indicate a duration of or time remaining within time frame 216. For example, as shown, time frame 216, during which target user 220 is sharing his or her location via location tracking feature 150 of mobile device 140, has 59 minutes remaining.

In some embodiments, as described above, an event location may be associated with a predefined area (e.g., within n meters surrounding a particular location, within a virtual or physical predefined border or barrier associated with a location, etc.). As described above, one or more of modules 102 (e.g., tracking module 108) may track a location (e.g., physical location 222) of target user 220 during time frame 216 by determining whether target user 220 is within the predefined area associated with the event location during the time frame. Upon one or more of modules 102 (e.g., tracking module 108) determining that target user 220 is within the predefined area associated with the event location during time frame 216, sharing module 110 may share the location of target user 220 with set of users 214 by notifying set of users 214 (e.g., at least one user included in set of users 214) that target user 220 is within the predefined area associated with the event location during time frame 216.

Likewise, upon one or more of modules 102 (e.g., tracking module 108) determining that target user 220 is not within the predefined area associated with the event location during time frame 216 (e.g., at a point in time included in time frame 216), sharing module 110 may share the location of target user 220 with set of users 214 by notifying set of users 214 (e.g., at least one user included in set of users 214) is not within the predefined area associated with the event location during time frame 216.

Furthermore, sharing module 110 may share a location of target user 220 with set of users 214 (e.g., at least one user included in set of users 214) by notifying set of users 214 (e.g., at least one user included in set of users 214) of the location of target user 220 during time frame 216. Sharing module 110 may notify set of users 214 in any suitable way, such as via a notification feature of the social networking system and/or a messaging feature of the social networking system. For example, as described above in reference to FIG. 10, sharing module 110 may share a graphical depiction of a location of target user 220 via a messaging interface of a social networking system, such as location interface 1010 included in messaging interface 1002 in FIG. 10.

Figure 11:
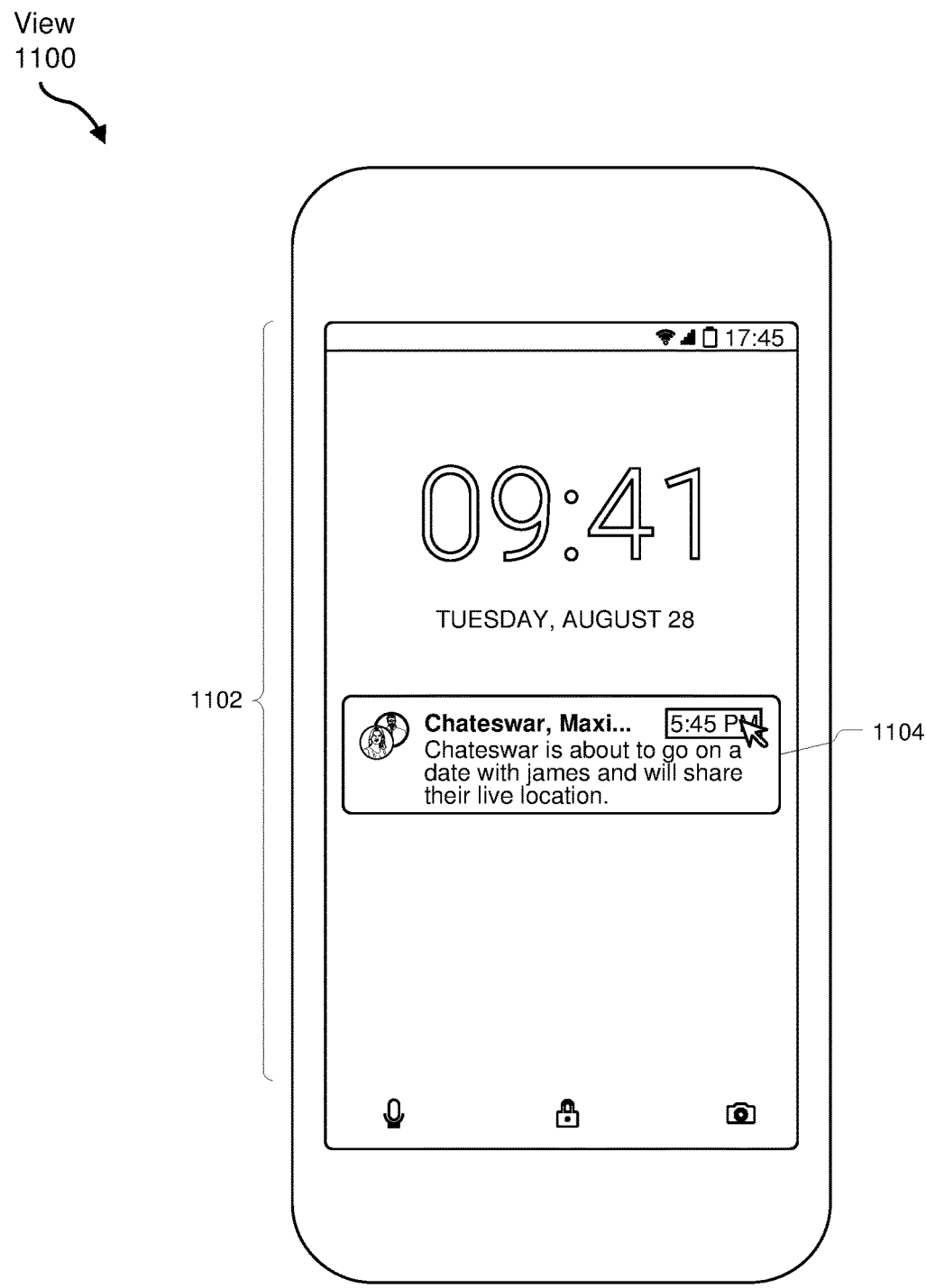
FIG. 11 is an example of a user interface that may present a notification of a sharing of a physical location of a target user in accordance with some embodiments described herein.

In some examples, one or more of modules 102 (e.g., including module 106, tracking module 108, sharing module 110, etc.) may further notify set of users 214 that a time frame associated with an event (e.g., time frame 216) is about to begin. To illustrate, FIG. 11 shows a user interface view 800 that may include a lock screen interface 1102. As with lock screen interface 802 described above, lock screen interface 1102 may be capable of presenting notifications from a social networking system.

One or more of modules 102 (e.g., sharing module 110) may access event data 218 and may determine that a start time associated with an event associated with target user 220 is approaching (e.g., the event may be scheduled to occur within a predetermined time following the time shown in user interface view 1100) or has occurred (e.g., user interface view 1100 may be presented before, during, or after time frame 216). Furthermore, one or more of modules 102 (e.g., including module 106) may have included a user of a mobile device presenting user interface view 1100 (e.g., user device 206) in set of users 214 in any of the ways described herein. For example, as described above, user Caitlyn may have discussed her plans to meet user James in person with users Maxi and Lasith via a messaging feature and/or interface of the social networking system. Users Maxi and Lasith may have agreed to be included in a set of users with whom target user Caitlyn's location may be shared with during Caitlyn's meeting with James.

Hence, one or more of modules 102 (e.g., receiving module 104) may present, via lock screen interface 1102 and/or any other suitable notification interface, a notification 1104 that may notify and/or remind one or both of users Maxi and Lasith that the time frame of Caitlyn's meeting with James is approaching, and that Caitlyn wishes to share her location during the time frame associated with the meeting with James. One or more of users Maxi and Lasith (e.g., any user included in set of users 214) may interact with (e.g., touch, click on, select, etc.) notification 1104, which may cause sharing module 110 to receive an input. In response, sharing module 110 may share, via the social networking system in any of the ways described herein, the physical location of user Caitlyn (e.g., target user 220) with the set of users (e.g., set of users 214 which, in this example, may include users Maxi and Lasith). Additionally or alternatively, sharing module 110 may present any other suitable interface view that may enable users Maxi and/or Lasith to view, monitor, and/or be informed of target user Caitlyn's location during the time frame associated with Caitlyn's meeting with James.

As discussed throughout the instant disclosure, the disclosed systems and methods may provide one or more advantages or benefits. For example, by enabling a user of a social networking system to select of one or more friends within the social networking system, and then by sharing the user's physical location with the selected friends during a time frame (e.g., a time frame of an event such as a business meeting or a social engagement), embodiments of the systems and methods described herein may reduce real or perceived safety concerns that meeting people in real life may raise. The selected friends may monitor or track the location of the user during the time frame, such as during a date with a social contact, a meeting with a business contact, and so forth. Thus, by reducing real or perceived safety concerns of the parties involved, embodiments of the systems and methods described herein may enable users of a social networking system to more easily and/or effectively transition virtual connections and/or relationships (e.g., connections or relationships facilitated by and/or existing within a virtual space such as a social networking system) to real-world connections and/or relationships.

EXAMPLE EMBODIMENTS

Example 1: A computer-implemented method comprising (1) receiving, via a user interface of a social networking system (a) a request to include a user of the social networking system in a set of users of the social networking system, and (b) a time frame associated with an event, (2) including the user in the set of users based on receiving the request to include the user in the set of users, (3) tracking, via a location tracking feature of a mobile device associated with a target user of the social networking system, a physical location of the target user during the time frame, and (4) sharing, via the social networking system during the time frame, the physical location of the target user with the set of users.

Example 2: The computer-implemented method of example 1, wherein (1) the method further comprises (a) presenting, via an additional user interface of the social networking system and in response to receiving the request to include the user in the set of users, a query whether the user agrees to be included in the set of users, and (b) receiving, via the additional user interface, an indication that the user agrees to be included in the set of users, and (2) including the user in the set of users is further based on receiving the indication that the user agrees to be included in the set of users.

Example 3: The computer-implemented method of any of examples 1 and 2, further comprising (1) determining, prior to an end time of the time frame, that the location tracking feature of the mobile device is disabled, and (2) enabling the location tracking feature of the mobile device in response to determining, prior to the end time of the time frame, that the location tracking feature of the mobile device is disabled.

Example 4: The computer-implemented method of example 3, wherein enabling the location tracking feature of the mobile device comprises (1) presenting, via the user interface of the social networking system, a prompt to enable the location tracking feature of the mobile device, (2) receiving, via the user interface of the social networking system, a user request to enable the location tracking feature of the mobile device, and (3) enabling the location tracking feature of the mobile device in response to receiving the user request to enable the location tracking feature of the mobile device.

Example 5: The computer-implemented method of any of examples 1-4, further comprising (1) determining, after an end time of the time frame, that the location tracking feature of the mobile device is enabled, and (2) disabling the location tracking feature of the mobile device in response to determining, after the end time of the time frame, that the location tracking feature of the mobile device is enabled.

Example 6: The computer-implemented method of example 5, wherein disabling the location tracking feature of the mobile device comprises (1) presenting, via the user interface of the social networking system, a prompt to disable the location tracking feature of the mobile device, (2) receiving, via the user interface of the social networking system, a user request to disable the location tracking feature of the mobile device, and (3) disabling the location tracking feature of the mobile device in response to receiving the user request to disable the location tracking feature of the mobile device.

Example 7: The computer-implemented method of any of examples 1-6, further comprising determining an event location associated with the event.

Example 8: The computer-implemented method of example 7, wherein determining the event location associated with the event comprises at least one of (1) receiving information representative of the event location via the user interface of the social networking system, or (2) identifying the event location from a set of predefined event data associated with the event.

Example 9: The computer-implemented method of any of examples 7 and 8, wherein (1) tracking the location of the target user during the time frame comprises determining whether the target user is within a predefined area associated with the event location during the time frame, and (2) sharing the location of the target user comprises at least one of (a) upon determining that the target user is within the predefined area associated with the event location during the time frame, notifying the set of users that the target user is within the predefined area associated with the event location during the time frame, or (b) upon determining that the target user is not within the predefined area associated with the event location during the time frame, notifying the set of users that the target user is not within the predefined area associated with the event location during the time frame.

Example 10: The computer-implemented method of any of examples 1-9, wherein sharing, via the social networking system during the time frame, the location of the target user with the set of users comprises notifying the set of users of the location of the target user during the time frame via at least one of (1) a notification feature of the social networking system, or (2) a messaging feature of the social networking system.

Example 11: The computer-implemented method of any of examples 1-10, wherein sharing the location of the target user with the set of users comprises presenting, to the set of users via a tracking interface of the social networking system during the time frame, a visual representation of the location of the target user during the time frame.

Example 12: The computer-implemented method of any of examples 1-11, wherein the event comprises a prearranged meeting of the user of the social networking system and an additional user of the social networking system.

Example 13: The computer-implemented method of example 12, wherein the user of the social networking system and the additional user of the social networking system are participants in a dating service of the social networking system.

Example 14: The computer-implemented method of any of examples 1-13, wherein the user interface of the social networking system comprises a dating interface of a dating service of the social networking system.

Example 15: A system comprising (1) a receiving module, stored in memory, that receives, via a user interface of a social networking system (a) a request to include a user of the social networking system in a set of users of the social networking system, and (b) a time frame associated with an event, (2) an including module, stored in memory, that includes the user in the set of users based on receiving the request to include the user in the set of users, (3) a tracking module, stored in memory, that tracks, via a location tracking feature of a mobile device associated with a target user of the social networking system, a physical location of the target user during the time frame, (4) a sharing module, stored in memory, that shares, via the social networking system during the time frame, the physical location of the target user with the set of users, and (5) at least one physical processor that executes the receiving module, the including module, the tracking module, and the sharing module.

Example 16: The system of example 15, wherein the including module further (1) presents, via an additional user interface of the social networking system and in response to the receiving module receiving the request to include the user in the set of users, a query whether the user agrees to be included in the set of users, (2) receives, via the additional user interface, an indication that the user agrees to be included in the set of users, and (3) includes the user in the set of users based on receiving the indication that the user agrees to be included in the set of users.

Example 17: The system of any of examples 15 and 16, wherein the tracking module further (1) determines, prior to an end time of the time frame, that the location tracking feature of the mobile device is disabled, and (2) enables the location tracking feature of the mobile device in response to determining, prior to the end time of the time frame, that the location tracking feature of the mobile device is disabled.

Example 18: The system of any of examples 15-17, wherein the tracking module further (1) determines, after an end time of the time frame, that the location tracking feature of the mobile device is enabled, and (2) disables the location tracking feature of the mobile device in response to determining, after the end time of the time frame, that the location tracking feature of the mobile device is enabled.

Example 19: The system of any of examples 15-18, wherein (1) the tracking module further (a) determines an event location associated with the event, and (b) tracks the location of the target user during the time frame by determining whether the target user is within a predefined area associated with the event location during the time frame, and (2) the sharing module shares the location of the target user by at least one of (a) upon determining that the target user is within the predefined area associated with the event location during the time frame, notifying the set of users that the target user is within the predefined area associated with the event location during the time frame, or (b) upon determining that the target user is not within the predefined area associated with the event location during the time frame, notifying the set of users that the target user is not within the predefined area associated with the event location during the time frame.

Example 20: A non-transitory computer-readable medium comprising computer-readable instructions that, when executed by at least one processor of a computing system, cause the computing system to (1) receive, via a user interface of a social networking system (a) a request to include a user of the social networking system in a set of users of the social networking system, and (b) a time frame associated with an event, (2) include the user in the set of users based on receiving the request to include the user in the set of users, (3) track, via a location tracking feature of a mobile device associated with a target user of the social networking system, a physical location of the target user during the time frame, and (4) share, via the social networking system during the time frame, the physical location of the target user with the set of users.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive location data to be transformed, transform the location data, output a result of the transformation to track a location of a mobile device, use the result of the transformation to share the location of the mobile device with at least one user of a social networking system, and store the result of the transformation to share the location of the mobile device with at least one additional user of the social networking system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
identifying, based on a set of previous social interactions within a social networking system (SNS), a set of friends of a target user within the SNS;
presenting the set of friends within a user interface of the SNS;
receiving, via the user interface of the SNS:
a request to include a user of the SNS included in the set of friends of the target user in a set of monitoring users of the SNS; and a time frame associated with an event;
including the user in the set of monitoring users based on receiving:
the request to include the user in the set of monitoring users; and
permission from the user to include the user in the set of monitoring users;
enabling a location tracking feature of a mobile device in response to determining that:
after a beginning time of the time frame and prior to an end time of the time frame, that the location tracking feature of the mobile device is disabled; and
the set of monitoring users comprises at least one user who has agreed to monitor a physical location of the target user during the time frame;
tracking, via a location tracking feature of a mobile device associated with the target user of the SNS, a physical location of the target user during the time frame; and
sharing, via the SNS during the time frame, the physical location of the target user with the set of monitoring users, the sharing comprising presenting, to the set of monitoring users via a group chat interface of the SNS during the time frame, a visual representation of a time remaining within the time frame.

2. The computer-implemented method of claim 1, wherein:
the method further comprises:
presenting, via an additional user interface of the SNS and in response to receiving the request to include the user in the set of monitoring users, a query whether the user agrees to be included in the set of monitoring users; and
receiving, via the additional user interface, an indication that the user agrees to be included in the set of monitoring users; and
including the user in the set of monitoring users is further based on receiving the indication that the user agrees to be included in the set of monitoring users.

3. The computer-implemented method of claim 1, wherein enabling the location tracking feature of the mobile device comprises:
presenting, via the user interface of the SNS, a prompt to enable the location tracking feature of the mobile device;
receiving, via the user interface of the SNS, a user request to enable the location tracking feature of the mobile device; and
enabling the location tracking feature of the mobile device in response to receiving the user request to enable the location tracking feature of the mobile device.

4. The computer-implemented method of claim 1, further comprising:
determining, after an end time of the time frame, that the location tracking feature of the mobile device is enabled; and
disabling the location tracking feature of the mobile device in response to determining, after the end time of the time frame, that the location tracking feature of the mobile device is enabled.

5. The computer-implemented method of claim 4, wherein disabling the location tracking feature of the mobile device comprises:
presenting, via the user interface of the SNS, a prompt to disable the location tracking feature of the mobile device;
receiving, via the user interface of the SNS, a user request to disable the location tracking feature of the mobile device; and
disabling the location tracking feature of the mobile device in response to receiving the user request to disable the location tracking feature of the mobile device.

6. The computer-implemented method of claim 1, further comprising determining an event location associated with the event.

7. The computer-implemented method of claim 6, wherein determining the event location associated with the event comprises at least one of:
receiving information representative of the event location via the user interface of the SNS; or
identifying the event location from a set of predefined event data associated with the event.

8. The computer-implemented method of claim 6, wherein:
tracking the location of the target user during the time frame comprises determining whether the target user is within a predefined area associated with the event location during the time frame; and
sharing the location of the target user comprises at least one of:
upon determining that the target user is within the predefined area associated with the event location during the time frame, notifying the set of monitoring users that the target user is within the predefined area associated with the event location during the time frame; or
upon determining that the target user is not within the predefined area associated with the event location during the time frame, notifying the set of monitoring users that the target user is not within the predefined area associated with the event location during the time frame.

9. The computer-implemented method of claim 1, wherein sharing, via the SNS during the time frame, the location of the target user with the set of monitoring users comprises notifying the set of monitoring users of the location of the target user during the time frame via at least one of:
a notification feature of the SNS; or
a messaging feature of the SNS.

10. The computer-implemented method of claim 1, wherein sharing the location of the target user with the set of monitoring users further comprises presenting, to the set of monitoring users via a tracking interface of the SNS during the time frame, a visual representation of the location of the target user during the time frame.

11. The computer-implemented method of claim 1, wherein the event comprises a prearranged meeting of the user of the SNS and an additional user of the SNS.

12. The computer-implemented method of claim 11, wherein the user of the SNS and the additional user of the SNS are participants in a dating service of the SNS.

13. The computer-implemented method of claim 1, wherein the user interface of the SNS comprises a dating interface of a dating service of the SNS.

14. The computer-implemented method of claim 10, wherein presenting the visual representation of the location of the target user during the time frame comprises presenting the visual representation of the location of the target user during the time frame within the group chat interface.

15. A system comprising:
a receiving module, stored in memory, that:

identifies, based on a set of previous social interactions within a social networking system (SNS), a set of friends of a target user within the SNS; and presents the set of friends within a user interface of the SNS;

receives, via the user interface of the SNS:
a request to include a user of the SNS included in the set of friends of the target user in a set of monitoring users of the SNS; and
a time frame associated with an event;

an including module, stored in memory, that includes the user in the set of monitoring users based on receiving:
the request to include the user in the set of monitoring users; and
permission from the user to include the user in the set of monitoring users;

a tracking module, stored in memory, that:
enables a location tracking feature of a mobile device in response to determining that:
after a beginning time of the time frame and prior to an end time of the time frame, that the location tracking feature of the mobile device is disabled; and
the set of monitoring users comprises at least one user who has agreed to monitor a physical location of the target user during the time frame: and
tracks, via a location tracking feature of a mobile device associated with the target user of the SNS, a physical location of the target user during the time frame;

a sharing module, stored in memory, that shares, via the SNS during the time frame, the physical location of the target user with the set of monitoring users, the sharing comprising presenting, to the set of monitoring users via a group chat interface of the SNS during the time frame, a visual representation of a time remaining within the time frame; and at least one physical processor that executes the receiving module, the including module, the tracking module, and the sharing module.

16. The system of claim 15, wherein the including module further:
presents, via an additional user interface of the SNS and in response to the receiving module receiving the request to include the user in the set of monitoring users, a query whether the user agrees to be included in the set of monitoring users;
receives, via the additional user interface, an indication that the user agrees to be included in the set of monitoring users; and
includes the user in the set of monitoring users based on receiving the indication that the user agrees to be included in the set of monitoring users.

17. The system of claim 15, wherein the tracking module further:
determines, after an end time of the time frame, that the location tracking feature of the mobile device is enabled; and
disables the location tracking feature of the mobile device in response to determining, after the end time of the time frame, that the location tracking feature of the mobile device is enabled.

18. The system of claim 15, wherein:
the tracking module further:
determines an event location associated with the event; and
tracks the physical location of the target user during the time frame by determining whether the target user is within a predefined area associated with the event location during the time frame; and the sharing module shares the physical location of the target user by at least one of:
upon determining that the target user is within the predefined area associated with the event location during the time frame, notifying the set of monitoring users that the target user is within the predefined area associated with the event location during the time frame; or
upon determining that the target user is not within the predefined area associated with the event location during the time frame, notifying the set of monitoring users that the target user is not within the predefined area associated with the event location during the time frame.

19. The system of claim 15, wherein the sharing module further shares, via the SNS during the time frame, the physical location of the target user with the set of monitoring users by presenting, to the set of monitoring users via a tracking interface of the SNS during the time frame, a visual representation of the location of the target user during the time frame.

20. A non-transitory computer-readable medium comprising computer-readable instructions that, when executed by at least one processor of a computing system, cause the computing system to:
identify, based on a set of previous social interactions within a social networking system (SNS), a set of friends of a target user within the SNS;
present the set of friends within a user interface of the SNS;
receive, via the user interface of the SNS:
a request to include a user of the SNS included in the set of friends of the target user in a set of users of the SNS; and
a time frame associated with an event;
include the user in the set of monitoring users based on receiving:
the request to include the user in the set of monitoring users; and
permission from the user to include the user in the set of monitoring users;
enable a location tracking feature of a mobile device in response to determining that:
after a beginning time of the time frame and prior to an end time of the time frame, that the location tracking feature of the mobile device is disabled; and
the set of monitoring users comprises at least one user who has agreed to monitor a physical location of the target user during the time frame;
track, via a location tracking feature of a mobile device associated with the target user of the SNS, a physical location of the target user during the time frame; and
share, via the SNS during the time frame, the physical location of the target user with the set of monitoring users, the sharing comprising presenting, to the set of monitoring users via a group chat interface of the SNS during the time frame, a visual representation of a time remaining within the time frame.

* * * * *